Feb. 28, 1961  A. B. BASSOFF  2,972,982
FLUID PRESSURE-OPERATED CONTROL AND
ADJUSTING MECHANISM THEREFOR
Filed Dec. 9, 1957  2 Sheets-Sheet 2
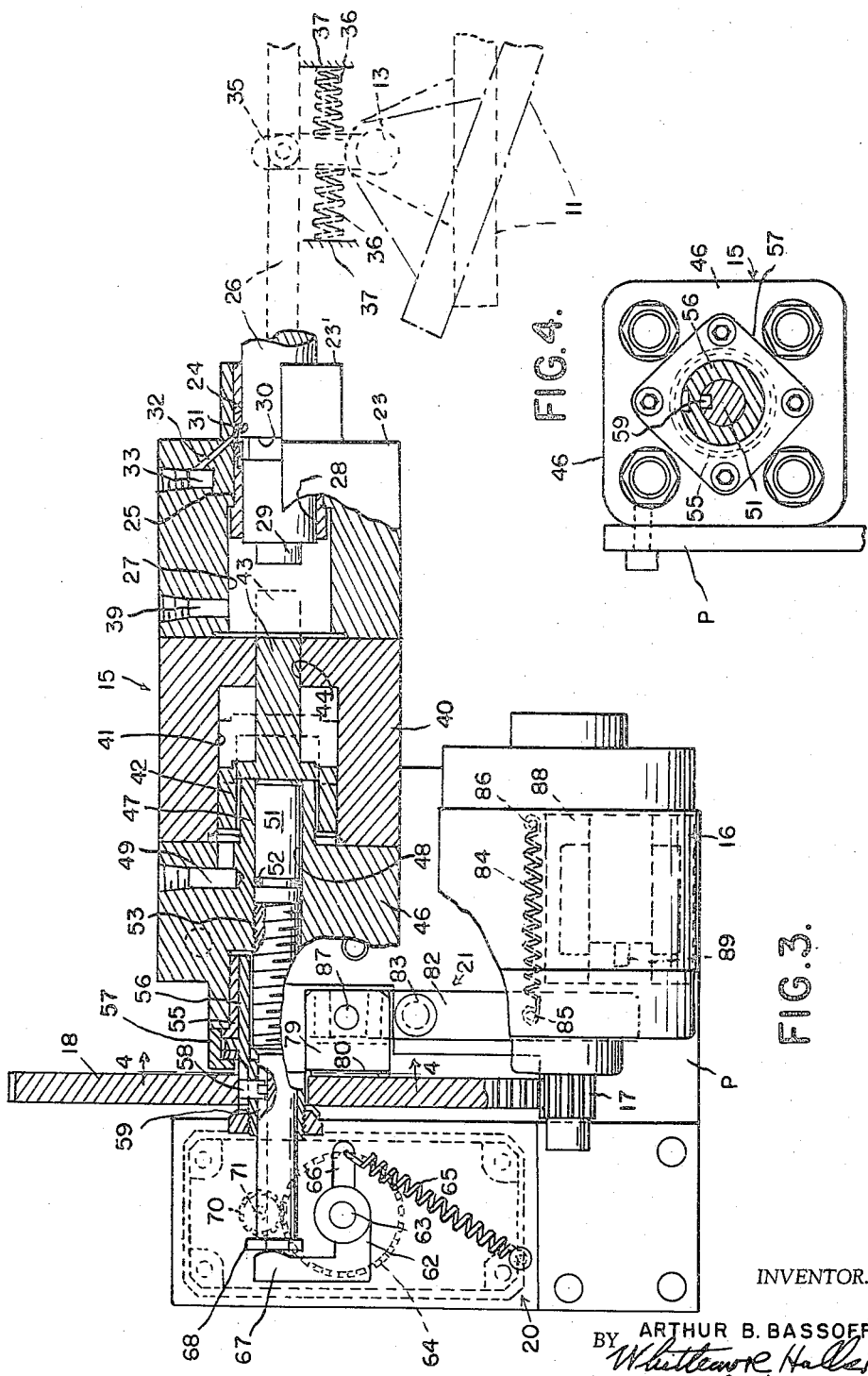
INVENTOR.
ARTHUR B. BASSOFF
BY
ATTORNEYS

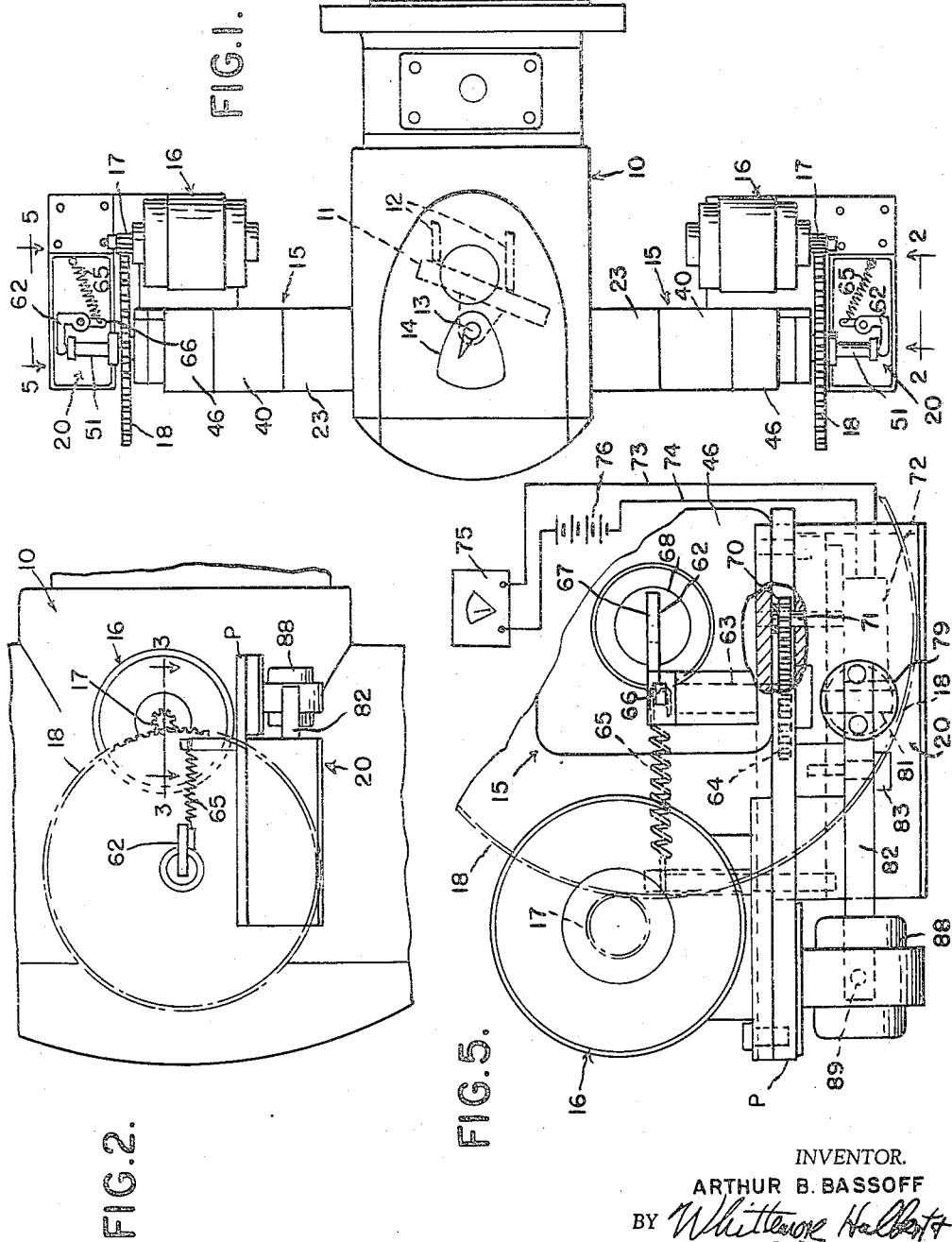

United States Patent Office 2,972,982
Patented Feb. 28, 1961

2,972,982

FLUID PRESSURE-OPERATED CONTROL AND ADJUSTING MECHANISM THEREFOR

Arthur B. Bassoff, Detroit, Mich., assignor to National Broach & Machine Company, Detroit, Mich., a corporation of Michigan Filed Dec. 9, 1957, Ser. No. 701,621

14 Claims. (Cl. 121—38)

The present invention relates to an improved speed controller for a motor or motor-pump unit of the so-called wobble-plate type. The improvement makes possible a more reliable speed control adjustment, and over a wider range of regulation, than existing comparable and conventional control arrangements, particularly of the manual type.

It is a general object of the invention to provide an improved and fully automatic cross-over control unit for adjusting the speed or output-determining wobble-plate of such a unit, or for a related type of adjustment of a related installation by effecting the bodily movement of an element controlling its speed or output capacity, it being recognized that the provisions of the invention are equally applicable to a motor unit or a pump unit operating on the general principle of the wobble-plate.

More specifically, it is an object to provide a reliable and wide range cross-over control mechanism of the foregoing type for use in the operation of a planer or like metal working machine, this control mechanism being of the Denison type, and one in which plunger type stop or abutment members determine the adjusted positions of the controlled wobble-plate and are variably set by hydraulic power means, rather than manually. The stop member is abutted by a thrust rod connected to the wobble-plate or equivalent element of the controlled unit.

Another object is to provide a control of this type, in which the hydraulically actuated plunger and variably positioned abutment are employed to obtain two different motor operating speeds, in both the forward and reverse directions and, in addition, an automatic centering for neutral or idle, enabling the control to be employed to great advantage in the operation of a planer or like reciprocatory, heavy duty machine tool.

A still further and more specific object is to provide a control unit of the foregoing type, in which the position of the abutment member is variably determined automatically by the motor actuation of a further threadedly adjustable stop, against which the abutment member engages endwise to limit its own axial movement.

Still another specific object is to provide a control unit of this sort in which the threadedly adjustable member has associated with it an improved position-sensing device, which device furnishes an indication, readable on an appropriately calibrated scale, of the speed in effect as the result of a given adjustment.

The foregoing as well as other objects become more apparent as this description proceeds, especially when considered in connection with the accompanying drawings illustrating a preferred embodiment of the invention, wherein:

Fig. 1 is a top plan view of a cross-over control unit of the Denison type having the improved provisions of the invention associated therewith;

Fig. 2 is a fragmentary view of the unit in end elevation and in an enlarged scale, as from the line 2—2 of Fig. 1;

Fig. 3 is a fragmentary plan view of one of the two like adjusting and sensing sections of the unit, being partially broken away and in horizontal section on line 3—3 of Fig. 2;

Fig. 4 is a fragmentary view in section on line 4—4 of Fig. 3; and

Fig. 5 is a fragmentary view in end elevation, as from the line 5—5 of Fig. 1.

Referring first to Fig. 1 of the drawings, the reference numeral 10 generally designates a motor-pump unit of the wobble-plate type, commonly employed in the operation of a reciprocatory type machine tool, such as a planer. In the operation of this type of unit, motor speed (or pump output in the event the unit is operated as a pump) is determined by the sliding engagement with an inclined wobble plate 11 of a circumferentially arranged series of plungers 12 carried by a rotary barrel (not shown). The wobble plate 11 is fixed to a transverse shaft 13, and its position of angular adjustment is ordinarily indicated by external pointer on the shaft 13 coacting with a calibrated scale 14.

This adjustment has heretofore been the result of a manual operation, not capable of expeditiously, reliably and satisfactorily affording a desired flexible and full range of operating outputs. The four widely variable forward and reverse settings and single neutral setting which the present improvement is capable of providing are simply not quickly and uniformly possible of attainment in a manual control unit.

The motor unit 10 is equipped with two identical speed control sections or assemblies 15 mounted to opposite sides thereof and operatively connected with the shaft 13 to cause its adjustment in the manner to be described; and it is to be understood that the assemblies 15 operate conjointly and reversely in the general manner of prior generally comparable wobble-plate controls.

Each of the control assemblies 15 is generally comprised of a suitably rated electrical reversing motor 16, to the shaft of which a pinion 17 is secured for meshing engagement with a large diameter gear 18, which gear is drivingly connected to a rotatively adjustable, mechanical stop mechanism of the assembly 15, in a manner to be described; a sensing mechanism 20 responsive to a control adjustment to indicate the resultant adjusted speed of unit 10; and a solenoid type braking mechanism 21 for the adjustable stop mechanism referred to.

Referring now to Fig. 3 of the drawings, the control assembly 15 is, in its function as directly applied to wobble plate 11, a hydraulically operated and centered one. It comprises a sectional, barrel-like housing made up of a first barrel section 23 of rectangular shape adapted to be mounted directly to the unit 10, as shown in Fig. 1, and having an end extension 23' receivable in the latter. The barrel extension 23' has an axial bore 24 receiving a special guide and centering bushing 25, in which a plunger 26 is mounted for reverse axial adjusting movement. Barrel section 23 has an internal counterbored cylinder 27 of larger diameter than the bore 28 of bushing 25, to which cylinder 27 the bushing bore opens, and the plunger 26 has an inner abutment end or head 29 sliding within cylinder 27 and subject to hydraulic pressure therein.

Adjacent the inner end thereof, and within the bushing 25 and barrel bore 24, the plunger 26 has an annular oil groove 30, and bushing 25 is also provided with an annular groove 31 midway between its ends; and when the control unit is in a neutral, zero speed, centering position the grooves 30 and 31 are in radial register, directly communicating with one another. The bushing groove 31 is communicated by an inclined passage 32 in barrel section 23 with a port 33 subject to hydraulic pressure whereby, with the plunger 26 in the neutral position of Fig. 3, it is centered by opposed and balanced hydraulic forces. Otherwise, the plunger seals the pressure passage 32.

In the neutral position referred to above, the control plunger 26, as conventionally connected to the wobble plate 11 by a radial arm 35 fixed to the wobble-plate shaft 13, holds the wobble plate in its centered, neutral position, shown in dotted line in Fig. 3, as distinguished from an adjustment shown in dot-dash line. Wobble plate 11 is resiliently urged to a roughly centered position in any suitable manner, as by opposed coil springs 36 acting between the arm 35 and opposed fixed abutments 37.

A liquid passage 39 communicates the cylinder 27 with a suitable hydraulic line through which pressure is applied recurrently to cylinder 27, under the control of a suitable reversing valve (not shown) conventionally associated with the controlled unit 10. Hence, as such hydraulic force is applied in cylinder 27 to the inner abutment end 29 of plunger 26 the latter is urged to the right (Fig. 3) to correspondingly adjust wobble plate 11, to the extent permitted by the stop provisions of the other control assembly 15. When hydraulic pressure in cylinder 27 is voided the plunger moves to the left to an extent correspondingly determined by its own similar stop provisions, now to be described.

A second or intermediate rectangular barrel section 40 of the control assembly 15 has an internal cylinder 41 formed therein, and a piston 42 of rearwardly cupped outline slides axially within cylinder 41 in peripherally sealed relation thereto. Piston 42 is equipped with an outwardly or forwardly extending stop stem 43 which slides in an axial connecting bore 44 between the cylinders 41 and 27. As illustrated in Fig. 3, a fully retracted, solid line position of the piston stop stem 43 may be considered its position for a maximum speed setting of the wobble plate 11, and its position shown in dotted line to be the position for a slower speed setting.

The third and last rectangular barrel section of the control assembly 15 is denoted 46. It has a tubular forward extension 47 received with appreciable clearance in the cupped left hand interior of the piston 42, and an axial bore 48 opens through this extension. A liquid pressure passage 49 in barrel section 46 communicates from the exterior of the section 46 with the cylinder 41 at the left of piston 42, and hydraulic pressure is recurrently applied through passage 49 to the cylinder 41 and piston 42 to urge the latter to the right, as viewed in Fig. 3.

This is done under the control of a suitable valve (not shown), in timed relation with the pressurization of plunger cylinder 27. Thus, the stop piston 42 is hydraulically urged toward a position in which it may serve as an end stop for the plunger 26 when the latter is actuated to the left; and the stop position of the stem 43 of piston 42 is in turn variably determined by the adjustment of the further mechanical stop provisions now to be described.

A mechanically adjustable stop rod 51 is mounted in the bore 48 of barrel section 46 for rotative and axial movement therein, being sealed relative to the bore by an O-ring 52. The rod 51 has threaded engagement at 53 with the bore 48, whereby rotation of the rod in either direction effects a corresponding axial adjustment of the same; and its forward or right hand end, per Fig. 3, is adapted to be received in and rearwardly abutted by the stop piston 42, at a position variably determined by threaded adjustment of rod 51.

The left hand or rear extremity of barrel section 46 is counterbored to receive a sleeve bushing 55, in which a tubular shaft 56 surrounding stop rod 51 is rotatively journaled, the sleeve having radial clearance for axial movement of the rod 51 relative thereto. A retainer cap 57 and associated washer hold the bushing and tubular shaft 56 in the axial direction.

The large diameter spur gear 18 (driven by motor pinion 17), is drivingly connected to the rear end of the rod 51 by means of a key member 58 fixed to and extending into the bore of the gear (extending through an aperture in tubular shaft 56), this key engaging in an elongated spline or slot 59 milled in the outer or rear end of the rod 51.

Other than in respect to its arrangement to operate the sensing and indicating mechanism 20 and its braking control by the solenoid actuated brake mechanism (to be further described), this completes the structure of the hydraulic-mechanical adjusting or control assembly 15 shown in Fig. 3, which is duplicated on the opposite side of the unit 10, as illustrated in Fig. 1.

In the operation of the assembly 15, it may be assumed that all parts are shown in solid line in the centering or neutral position of Fig. 3, with the solid line setting of the plunger stop stem 43 considered to be its position for maximum speed adjustment. Upon a hydraulically responsive shift of the adjusting plunger 26 to the left its stop head 29 engages stem 43. As this takes place the wobble plate 11 is swung counterclockwise from its neutral and centered, dotted line position to a maximum inclination opposite that shown in dot-dash line in Fig. 3, having been driven to this position by the plunger 26 (not shown) of the opposite control unit 15, through its intermediate connection at wobble-plate arm 35. This is under the hydraulic control of the opposite control mechanism.

The unit 10 now operates at full speed in the direction for which wobble plate is set, and may thus cause a machine tool to make a high speed traverse stroke. A reduced speed work stroke may then be had by predeterminedly pressurizing the piston cylinder 41 through its port 49, or voiding pressures on the opposite side, with the result that the stop stem 43 of piston 42 is advanced to the right (Fig. 3) to an intermediate dotted line position. Plunger 26 is correspondingly shifted to the right, and the unit 10 operates at the reduced speed occasioned by the resultant milder inclination of wobble plate 11.

It is evident that the respective hydraulic pressure connections, by which the plungers 26 and pistons 42 of the respective control assemblies 15 are pressurized in alternation, passing through the solid line, neutral phase of Fig. 3, are controlled by suitable reversing valving coordinated with the operation of unit 10. The invention does not deal with provisions of this more or less conventional sort.

Should it be desired to reduce the maximum speed rate, on either a forward or reverse stroke, this is accomplished by advancing the mechanical stop rod 51 to the right, as to a position in which it rearwardly sustains piston 42 and its stop stem 43 in a more advanced or rightward position, for example, intermediate the positions shown in solid and dotted line in Fig. 3. As thus engaged by plunger head 29 the stop structure limits the adjustment of wobble plate 11 between its adjustments depicted in dotted and dot-dash line.

As indicated above, the desired stop position of the mechanical stop rod 51 is in accordance with its rotative and axial adjustment upon energization of the reversing control motor 16 to drive motor pinion 17 and the gear 18 keyed to rod 51. The resultant axial movement of rod 51 is employed to operate the position sensing and indicating device 20.

The device 20 includes a rocker 62 (Figs. 2, 3 and 5), in the form of a bell crank secured to a transversely journaled stub shaft 63 on which a small spur gear 64 is fixedly mounted. An anchored coil tension spring 65 acts upon a lateral extension 66 of the rocker 62 to urge the latter in clockwise direction, as viewed in Fig. 3, thereby urging a further feeler arm 67 of the rocker against an enlarged outer bearing head 68 on stop rod 51. Thus, inward or rightward and outward or leftward axial movements of the rod 51 occasion, respectively, clockwise and counterclockwise movement of rocker 62, with corresponding reversible rotation of spur gear 64.

The gear 64 meshes with a small pinion 70 carried on the shaft 71 of a rotary type electrical potentiometer 72 (Fig. 5) of conventional design; and electrical leads 73, 74 are connected from the terminals of the potentiometer 72 to a conventional voltmeter 75, with a battery 76 inserted in the lead 74.

The voltmeter may be calibrated in terms of RPM or linear speed, thus to afford a visual indication of the speed resulting from the adjustment effected by axial adjustment of stop rod 51. In the alternative, the voltmeter might be calibrated in terms of output capacity in a pumping installation.

Energization of the adjusting control motor 16 is through a simple electrical pushbutton circuit, the nature of which will be obvious to those skilled in the art, and its de-energization is attended by braking of the large gear 18, thus to bring the adjusting rotation of rod 51 to an abrupt halt. To this end, a brake head 79 (Figs. 3 and 5) is provided having a frictional brake disk 80 disposed for engagement with the adjacent side surface of the gear 18. Brake head 79 is swiveled at 81 on an outer arm of an actuating lever 82, which lever is pivotally mounted at 83 on a fixed mounting plate P, which also supports motor 16 and various other instrumentalities making up the control assembly 15, the sensing mechanism 20 and the brake mechanism 21.

A coil tension spring 84 acts between the pin 85 on the lever 82 and a fixed anchor 86 to urge the brake 79 counterclockwise, as viewed in Fig. 3, i.e., in a direction to engage gear 18.

The brake unit 21 is released by means of an electrical solenoid 88, whose core 89 has thrust engagement with the end of brake lever 82 opposite its head 79. Solenoid 88 is energized simultaneously with the energization of motor 16 for this operation.

It is seen that the invention affords an improved automatic control system for the cross-over control of a wobble-plate operated or equivalent type apparatus involving physical shift of a control member in the adjustment of its output. The system incorporates an improved hydraulic control assembly unit 15 employing adjustably positionable, hydraulically sustained stop means to obtain different operating speeds by limiting the retractile stroke of actuating plunger 26, as in turn further determined by end abutment of the hydraulic stop plunger 42 on the mechanically adjustable stop rod 51. These adjustments are had in combination with a hydraulically balanced neutral position, in which groove 30 of plunger 26 receives steady hydraulic pressure through registering port 33 of barrel section 23. A second major component of the system is embodied in a motor operated control drive for the last named stop rod, enabling an entirely automatic regulation heretofore which can be relied on, with the assistance of an associated automatic sensing unit 20 by which a visual reading of the effect of the adjustment is quickly and conveniently had.

The drawings and the foregoing specification constitute a description of the improved motor controller in such full, clear, concise and exact terms as to enable any person skilled in the art to practice the invention, the scope of which is indicated by the appended claims.

What I claim as my invention is:

1. A control unit of the type described, comprising means actuated in one direction by fluid pressure to mechanically adjust a speed control or like device, a stop mechanism having a stop piston member sustained under fluid pressure in a predetermined position to be operatively engaged by and sustain said adjusting means against movement in a reverse direction, past said predetermined position, and a mechanism to adjust the stop position of said piston member and thereby vary the sustained position of said adjusting means, said mechanism including a mechanically adjustable stop element engaged by said piston member, and selectively operable means operatively connected to said stop element to vary the axial position thereof in both directions.

2. A control unit of the type described, comprising means actuated in one direction by fluid pressure to mechanically adjust a speed control or like device, a stop mechanism having a stop piston member sustained under fluid pressure in a predetermined position to be operatively engaged by and sustain said adjusting means against movement in a reverse direction, past said predetermined position, and a mechanism to adjust the stop position of said piston member and thereby vary the sustained position of said adjusting means, comprising a mechanical stop rod variably positionable axially for abutting engagement by said piston, and selectively operable means mechanically connected to said stop rod to vary the axial position of the latter in both directions.

3. A control unit of the type described, comprising means actuated in one direction by fluid pressure to mechanically adjust a speed control or like device, a stop mechanism having a stop piston member sustained under fluid pressure in a predetermined position to be operatively engaged by and sustain said adjusting means against movement in a reverse direction, past said predetermined position, and a mechanism to adjust the stop position of said piston member and thereby vary the sustained position of said adjusting means, comprising a mechanical stop rod variably positionable axially for abutting engagement by said piston, and a motor having means mechanically connecting the same to said rod to reversibly control its axial position.

4. A control unit of the type described, comprising means actuated in one direction by fluid pressure to mechanically adjust a speed control or like device, including a cylinder provided with means to connect the same with a source of fluid pressure and having a plunger movable in said direction therein under said pressure and operatively connected to said device, a stop mechanism having a stop piston member sustained under fluid pressure in a predetermined position to be operatively engaged by and sustain said plunger against movement in a reverse direction past said predetermined position, said mechanism including a further cylinder having means to connect the same to a source of fluid pressure and slidably receiving said piston in axial alignment with said plunger, and a mechanism to adjust the stop position of said piston member and thereby vary the sustained position of said plunger, comprising a mechanical stop rod variably positionable axially for abutting engagement by said piston, and selectively operable means mechanically connected to said stop rod to vary the axial position of the latter in both directions.

5. A control unit of the type described, comprising means actuated in one direction by fluid pressure to mechanically adjust a speed control or like device, including a cylinder provided with means to connect the same with a source of fluid pressure and having a plunger movable in said direction therein under said pressure and operatively connected to said device, a stop mechanism having a stop piston member sustained under fluid pressure in a predetermined position to be operatively engaged by and sustain said plunger against movement in a reverse direction, past said predetermined position, said mechanism including a further cylinder having means to connect the same to a source of fluid pressure and slidably receiving said piston in axial alignment with said plunger, said piston member being subject to a greater force than said plunger to sustain the latter, and a mechanism to adjust the stop position of said piston member and thereby vary the sustained position of said plunger, comprising a mechanical stop rod variably positionable axially for abutting engagement by said piston, and a motor mechanically connected to said rod to reversibly control its axial position.

6. A control unit of the type described comprising housing means providing first and second axially aligned, fluid pressurizable cylinders and an axial bore therebetween, an actuating plunger slidable in and axially outwardly of said first cylinder under pressure therein, a stop piston predeterminedly positionable in said second cylinder under pressure therein and having a portion receivable in said bore and first cylinder to limit reverse movement of said plunger, said housing means providing a further bore opening axially to the side of said second cylinder opposite said first bore, a stop rod axially adjustable in said further bore, for variable stop engagement with said piston to determine the plunger-limiting position of the latter, and selectively operable means mechanically connected to said stop rod to adjust the axial position thereof in both directions.

7. A control unit of the type described comprising housing means providing first and second axially aligned, fluid pressurizable cylinders of smaller and larger respective diameter and an axial bore therebetween, an actuating plunger slidable in and axially outwardly of said first cylinder under pressure therein, a stop piston predeterminedly positionable in said second cylinder under pressure therein and having a portion receivable in said bore and first cylinder to limit reverse movement of said plunger, said housing means providing a further bore opening axially to the side of said second cylinder opposite said first bore, a stop rod axially adjustable in said further bore, for variable stop engagement with said piston to determine the plunger-limiting position of the latter, and selectively operable means mechanically connected to said stop rod to adjust the axial position thereof in both directions.

8. A control unit of the type described comprising housing means providing first and second axially aligned, fluid pressurizable cylinders and an axial bore therebetween, an actuating plunger slidable in and axially outwardly of said first cylinder under pressure therein, a stop piston predeterminedly positionable in said second cylinder under pressure therein and having a portion receivable in said bore and first cylinder to limit reverse movement of said plunger, said housing means providing a further bore opening axially to the side of said second cylinder opposite said first bore, a stop rod axially adjustable in said further bore, said stop rod being threadedly engaged with said housing means for axial movement upon rotation relative to the latter, for variable stop engagement with said piston to determine the plunger-limiting position of the latter, and means to axially adjust said stop rod.

9. A control unit of the type described comprising housing means providing first and second axially aligned, fluid pressurizable cylinders and an axial bore therebetween, an actuating plunger slidable in and axially outwardly of said first cylinder under pressure therein, a stop piston predeterminedly positionable in said second cylinder under pressure therein and having a portion receivable in said bore and first cylinder to limit reverse movement of said plunger, said housing means providing a further bore opening axially to the side of said second cylinder opposite said first bore, a stop rod axially adjustable in said further bore, said stop rod being threadedly engaged with said housing means for axial movement upon rotation relative to the latter, for variable stop engagement with said piston to determine the plunger-limiting position of the latter, and means to axially adjust said stop rod, including a motor mechanically connected to said stop rod to reversibly rotate the latter.

10. A control unit of the type described comprising housing means providing first and second axially aligned, fluid pressurizable cylinders and an axial bore therebetween, an actuating plunger slidable in and axially outwardly of said first cylinder under pressure therein, a stop piston predeterminedly positionable in said second cylinder under pressure therein and having a portion receivable in said bore and first cylinder to limit reverse movement of said plunger, said housing means providing a further bore opening axially to the side of said second cylinder opposite said first bore, a stop rod axially adjustable in said further bore, for variable stop engagement with said piston to determine the plunger-limiting position of the latter, and means to axially adjust said stop rod, and a mechanism operatively connected to and responsive to axial movement of said stop rod to indicate its effect on said control unit, said mechanism including a part operated directly by said stop rod.

11. A control unit in accordance with claim 10, in which the means to axially adjust said stop rod comprises a motor-driven member drivingly connected to said stop rod, and further comprising a brake device engageable with said rotatable member to brake rotation thereof.

12. A control unit of the type described comprising housing means providing first and second axially aligned, fluid pressurizable cylinders and an axial bore therebetween, an actuating plunger slidable in and axially outwardly of said first cylinder under pressure therein, a stop piston predeterminedly positionable in said second cylinder under pressure therein and having a portion receivable in said bore and first cylinder to limit reverse movement of said plunger, said housing means providing a further bore opening axially to the side of said second cylinder opposite said first bore, a stop rod axially adjustable in said further bore, for variable stop engagement with said piston to determine the plunger-limiting position of the latter, and means to axially adjust said stop rod, and a mechanism operatively connected to and responsive to axial movement of said stop rod to indicate its effect on said control unit, said last named mechanism comprising a feeler directly engaging and moved under the control of said rod, and indicating means including an electrical indicating circuit variably energized in response to movement of said feeler.

13. A control unit of the type described comprising housing means providing first and second axially aligned, fluid pressurizable cylinders and an axial bore therebetween, an actuating plunger slidable in and axially outwardly of said first cylinder under pressure therein, a stop piston predeterminedly positionable in said second cylinder under pressure therein and having a portion receivable in said bore and first cylinder to limit reverse movement of said plunger, said housing means providing a further bore opening axially to the side of said second cylinder opposite said first bore, a stop rod axially adjustable in said further bore, being threadedly engaged with said housing means for axial movement upon rotation relative to the latter, for variable stop engagement with said piston to determine the plunger-limiting position of the latter, and means to axially adjust said stop rod, including a motor operatively connected to said stop rod to reversibly rotate the latter, and a mechanism operatively connected to and responsive to axial movement of said stop rod to indicate its effect on said control unit, said last named mechanism comprising a feeler directly engaging and moved under the control of said rod, and indicating means including an electrical indicating circuit variably energized in response to movement of said feeler.

14. A control unit in accordance with claim 13, in which the operative connection of said motor to said stop rod includes a rotatable member drivingly connected to said motor, and further comprising a brake device engageable with said rotatable member to brake rotation thereof.

References Cited in the file of this patent

UNITED STATES PATENTS

| | | |
|---|---|---|
| 2,400,330 | Allen | May 14, 1946 |
| 2,423,472 | Welsh | July 8, 1947 |
| 2,443,345 | Ernst | June 15, 1948 |
| 2,630,786 | Poore | Mar. 10, 1953 |